(12) United States Patent
Sadovsky et al.

(10) Patent No.: US 9,148,399 B1
(45) Date of Patent: Sep. 29, 2015

(54) AUTOMATIC PUBLICATION OF A USER'S APPLICATION INSTALLATION EVENTS

(75) Inventors: Adam Sadovsky, Mountain View, CA (US); Michael Chan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 620 days.

(21) Appl. No.: 13/529,152

(22) Filed: Jun. 21, 2012

Related U.S. Application Data

(60) Provisional application No. 61/499,612, filed on Jun. 21, 2011.

(51) Int. Cl.
*G06F 15/16* (2006.01)
*H04L 12/58* (2006.01)

(52) U.S. Cl.
CPC ...................................... *H04L 51/32* (2013.01)

(58) Field of Classification Search
CPC ....................................................... H04L 51/32
USPC ......................................................... 709/204
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,303,415 B2 * | 11/2012 | Craine et al. | ..................... 463/42 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |

(Continued)

FOREIGN PATENT DOCUMENTS

WO   WO02079984   10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Brian J Gillis
*Assistant Examiner* — Michael A Keller
(74) *Attorney, Agent, or Firm* — Patent Law Works LLP

(57) ABSTRACT

A system and a method for notifying users of the installation of applications using social networks. An application broadcaster automatically publishes a user's application installation events on one platform to the user's activity streams on external social platforms. This way, a message regarding the application appears in the user's activity streams within social networks, resulting in the application becoming popular among the user's friends. In one embodiment, the application broadcaster determines whether user activity associated with the installed application meets a criterion before broadcasting information about the application. The application broadcaster also suggests applications that the user might find interesting.

17 Claims, 8 Drawing Sheets

(56) References Cited

U.S. PATENT DOCUMENTS

| | | |
|---|---|---|
| 2007/0171898 A1 | 7/2007 | Salva |
| 2007/0173236 A1 | 7/2007 | Vishwanathan et al. |
| 2007/0248077 A1 | 10/2007 | Mahle et al. |
| 2008/0056475 A1 | 3/2008 | Brannick et al. |
| 2008/0192656 A1 | 8/2008 | Vagelos |
| 2011/0047013 A1* | 2/2011 | McKenzie, III ............. 705/14.4 |
| 2011/0098156 A1 | 4/2011 | Ng et al. |
| 2012/0136465 A1* | 5/2012 | Guinn et al. .................... 700/92 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

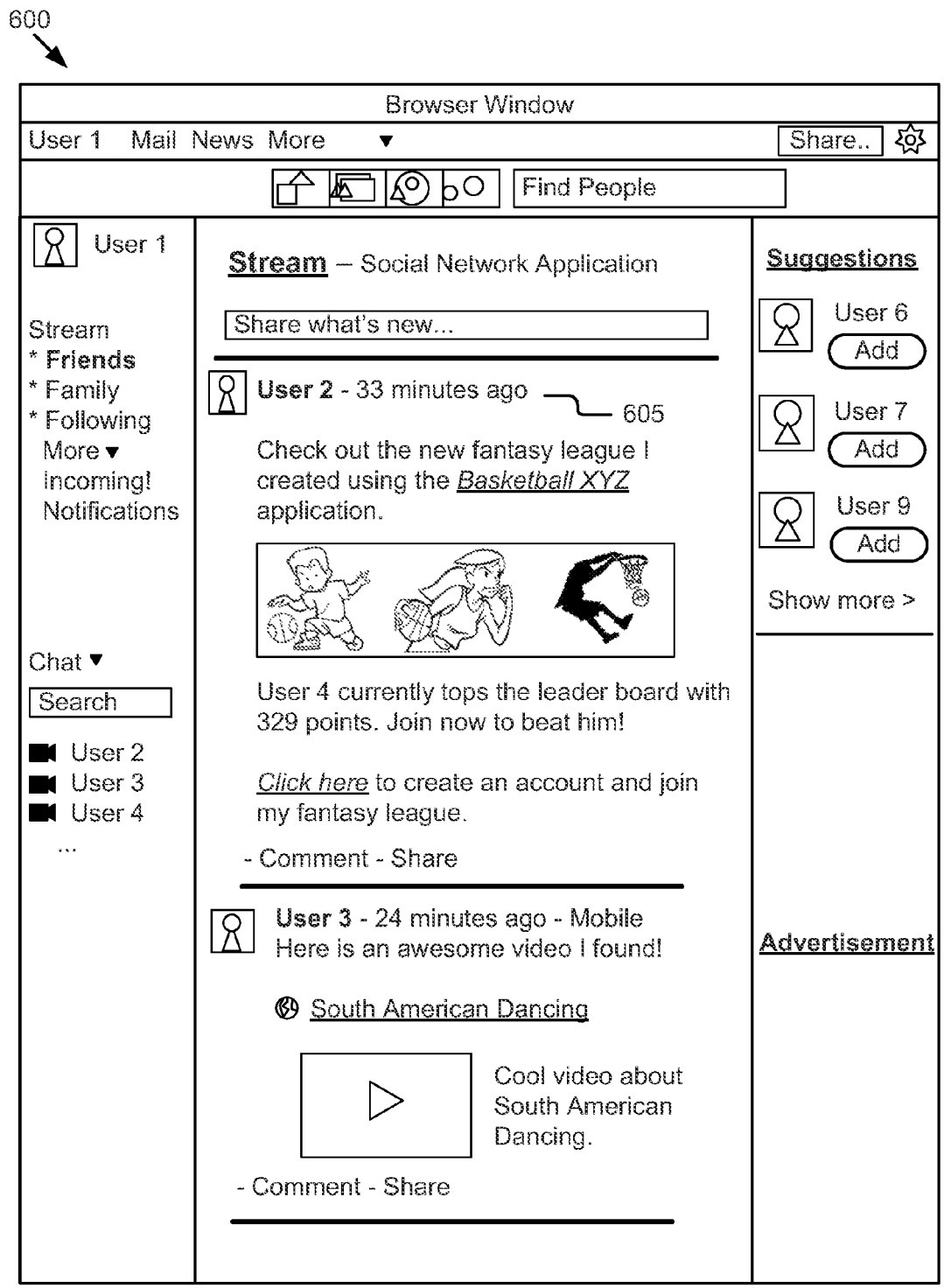
Figure 6A — Message broadcasted in Social network – without a limit on content Message broadcasted in Microblogging network — with a limit on content

AUTOMATIC PUBLICATION OF A USER'S APPLICATION INSTALLATION EVENTS

CROSS REFERENCE TO RELATED APPLICATIONS

This application claims priority under 35 USC §119(e) to U.S. Application No. 61/499,612, entitled "Automatic Publication of a User's Application Installation Events" filed Jun. 21, 2011, the entirety of which is herein incorporated by reference.

BACKGROUND

The specification relates to using social networks for spreading notifications about applications. In particular, the specification relates to a system and a method for automatically publishing a user's application installation events on one platform to the user's activity streams on external social platforms.

With the advent of a variety of computing platforms such as smartphones and portable computers, there has been an enormous growth in the number of applications being developed for them. However, the discovery of these applications by users remains a major problem. Although, the applications are categorized by type in online application stores, users are still required to know the exact name of the application to be able to search for them. Due to this reason, developers get discouraged as most applications go unnoticed in the plethora of existing ones.

Currently there are a few applications that increase the visibility of other applications by suggesting applications to a user that have been installed by the user's friends. But this does not solve the problem of locating the applications in the online application store because the user still needs to find and install the applications.

SUMMARY

According to one innovative aspect of the subject matter described in this disclosure, a processing module receives a notification indicating an installation of an application and information about the application, an activity analyzer coupled to the processing module, determines whether the user activity associated with the application meets a criterion for broadcasting information about the application and a broadcasting module coupled to the processing module and the activity analyzer, composes a message regarding the application responsive to determining that the user activity associated with the application meets the criterion for broadcast and broadcasts the message to one or more social networks associated with the user.

In general, another innovative aspect of the subject matter described in this disclosure may be embodied in methods that include receiving a notification indicating an installation of an application on a user device, receiving information about the application, determining whether the user activity associated with the application meets a criterion for broadcasting information about the application, composing a message regarding the application responsive to determining that the user activity associated with the application meets the criterion for broadcast and broadcasting the message to one or more social networks associated with the user.

Other implementations of one or more of these aspects include corresponding systems, apparatus, and computer programs, configured to perform the actions of the methods, encoded on computer storage devices.

These and other implementations may each optionally include one or more of the following features. For instance, the operations further include: analyzing at least one of the user's activity with the application, the user's rating for the application and a number of applications installed by the user; transmitting the message to the user and receiving an approval from the user for broadcasting the message to the one or more social networks associated with the user; modifying the message based on a setting associated with each of the one or more social networks associated with the user; receiving a feedback from the one or more social networks, the feedback including an interaction of a friend of the user with the message; analyzing the feedback to determine an interest of the friend of the user; and receiving, from the one or more social networks, information about applications installed by a friend of the user and suggesting the applications installed by the friend of the user to the user.

For instance, the features include: information about the application further including at least one of a summary of the application, a reference to the application, a photo, a video, a review and a rating; notification further indicating an installation of an update to the application; and the user's activity with the application further including at least one of a frequency of usage of the application and a time spent by the user with the application.

The present disclosure may be particularly advantageous in a number of respects. First, the application broadcaster automatically publishes a message regarding a user's application installation events on one platform to the user's activity streams on external social platforms. As a result, the application gets advertised and becomes popular amongst the user's friends. Second, the application broadcaster analyzes the user's activity and determines whether a message regarding the installed application should be broadcasted to the user's social networks. As a result, the application broadcaster does not spam the user's activity steams on the external social platforms. Third, the application broadcaster suggests applications that the user might enjoy based on the activities and interests of the user's friends on the external social platforms.

BRIEF DESCRIPTION OF THE DRAWINGS

The specification is illustrated by way of example, and not by way of limitation in the figures of the accompanying drawings in which like reference numerals are used to refer to similar elements.

FIG. 6A is a graphical illustration of a stream of content on a social network application according to some embodiments.

DETAILED DESCRIPTION

Example Overview

The description includes a system and method for using social networks to encourage adoption of applications. As an example, when a user installs an application on a user device, an application broadcaster automatically composes and broadcasts a message about the installed application to the social networks associated with the user. The message about the application may include, for example, a summary of the application, a reference to the application, a photo, a video, a review and a rating, the user's activity with the application, etc. Thus, other users of the social network (for example, the user's friends) become informed about the installed application.

In some embodiments, the application broadcaster includes an installation module, an activity analyzer and a broadcasting module. The installation module receives a notification indicating that a user installed an application on a user device. The activity analyzer determines whether the user activity associated with the application installed on the user device meets a criterion for broadcasting information about the application. For example, the activity analyzer determines whether the user activity associated with the application meets the criterion for broadcasting information about the application based at least in part on the average time the user spends interacting with the application. If the user activity meets the criterion for broadcast, the broadcasting module composes a message about the application and broadcasts the message to social networks associated with the user.

In one embodiment, application broadcaster includes a message modifier that modifies the message composed by the application broadcaster based at least in part on the settings of the social networks. For example, the message modifier may remove a summary of the installed application and provide a link to fit the message within a word limit imposed by a micro-blogging social network.

System Overview

Figure 1:
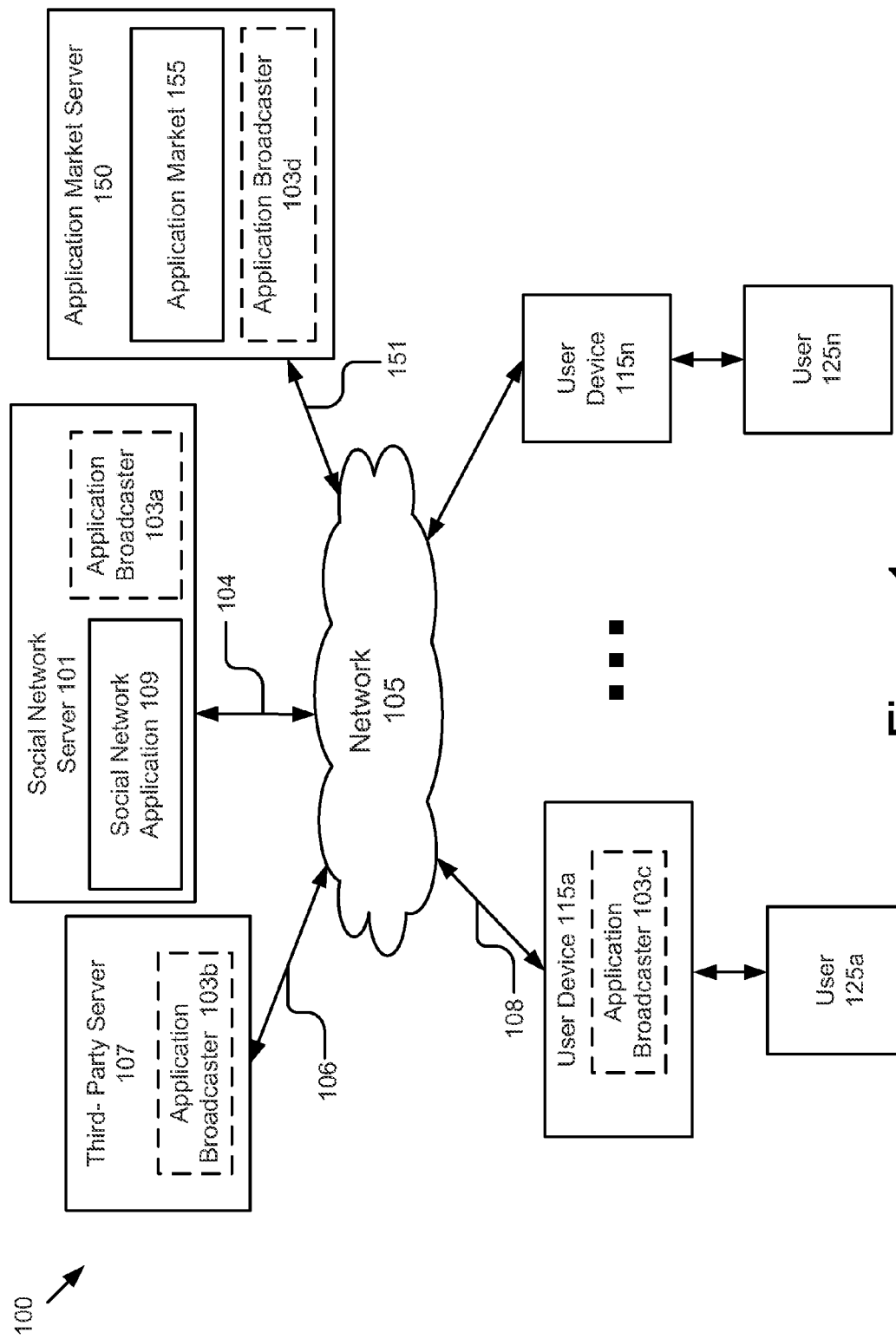
FIG. 1 is a block diagram illustrating an application broadcaster that can be stored on various entities in a social network.

FIG. 1 illustrates a block diagram of a system 100 for using social networks for spreading applications according to some embodiments. The system 100 includes user devices 115a, 115n that are accessed by users 125a, 125n, a social network server 101, a third-party server 107 and an application market server 150. In the illustrated embodiment, these entities are communicatively coupled via a network 105. In FIG. 1 and the remaining figures, a letter after a reference number, such as "115a" is a reference to the element having that particular reference number. A reference number in the text without a following letter, such as "115," is a general reference to any or all instances of the element bearing that reference number.

In one embodiment, the application broadcaster 103a is operable on the social network server 101, which is coupled to the network via signal line 104. The social network server 101 also contains a social network application 109. Thus, in some embodiments, the application broadcaster 103a is a component of the social network application 109. Although only one social network server 101 is shown, one or more social network servers may be present. The term social network as used herein encompasses its plain and ordinary meaning including, but not limited to, any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph. In some examples, the social graph can reflect a mapping of these users and how they are related. The social graph is stored on the social network server 101 (not shown).

In some embodiments, the application broadcaster 103b is stored in part on a third-party server 107, which is connected to the network 105 via signal line 106. The third-party server 107 includes other types of applications, such as an application for publishing a website. In one example, the application broadcaster 103b is embeddable code for generating and transmitting broadcasts to the social network server 101 in response to the user 125a downloading an application. In some embodiments, the application broadcaster 103b receives information from the social network application 109 about users that visit the website and identifies the user on the website as being associated with the social network application 109 via an application programming interface (API).

In yet another embodiment, the application broadcaster 103c is stored on a user device 115a, which is connected to the network via signal line 108. The user device 115a can be a computing device, for example, a laptop computer, a desktop computer, a tablet computer, a mobile telephone, a personal digital assistant (PDA), a mobile email device, a game console, a portable game player, a portable music player, a television with one or more processors embedded therein or coupled thereto or any other electronic device capable of accessing the network 105. In one embodiment, the application broadcaster 103c is a browser plug-in. In another embodiment, the application broadcaster 103c is an application stored on a mobile device, such as a smartphone. The user 125a interacts with the user device 115a. When a user 125a downloads an application to the user device 115a, the application broadcaster 103c generates and transmits a broadcast to the social network application 109 to notify the other social network users of the user's activities. Although only two user devices 115a, 115n are illustrated, persons of ordinary skill in the art will recognize that one or more user devices 115n are available to one or more users 125n.

In some embodiments, the application broadcaster 103d is operable on the application market server 150, which is coupled to the network via signal line 151. The application market server 150 also contains an application market 155. Although only one application market server 150 is shown, one or more application market servers 150 may be present. An application market 155 can be any type of store that allows users to search, browse, purchase and download applications. In one embodiment, the application broadcaster 103d is part of the application market 155, e.g. the application broadcaster 103d is part of the same program and is considered part of the same system. The application broadcaster 103d works directly with the application market 155 to broadcast the purchase and/or installation of applications purchased by a user from the application market 155. In one example, the application broadcaster 103d incorporates ratings information received by the application market into its own ratings module. The application broadcaster 103d transmits the user activity to the social network application 109 for broadcasting.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 105 is coupled to the user devices, 115a, 115n, the social network server 101, the third party server 107 and the application market server 150, in practice one or more networks 105 can be connected to the entities.

Example System

Figure 2A:
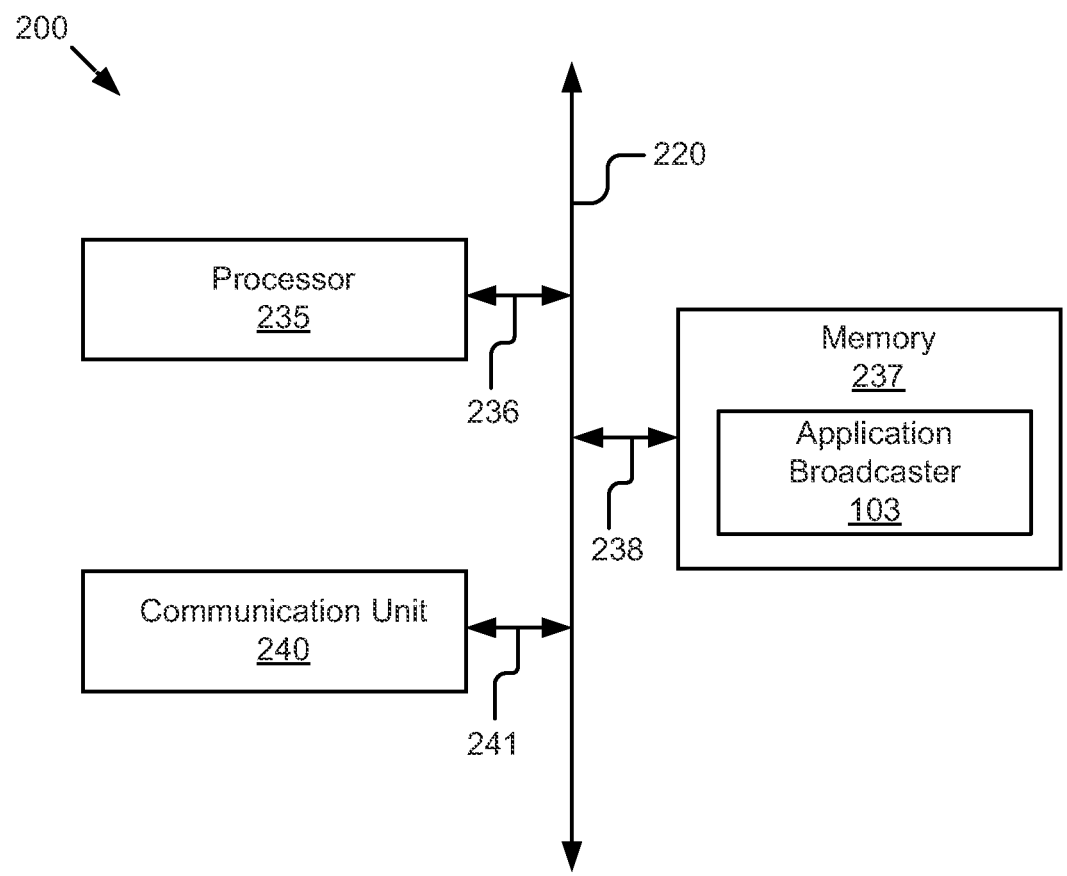
FIG. 2A is a block diagram illustrating an example of a computing device for broadcasting notifications about applications.

Referring now to FIG. 2A, the hardware implementing the functionality of using social networks for spreading applications is shown in more detail. FIG. 2A is a block diagram of a computing device 200 that includes a communication unit 240, a memory 237 and a processor 235 that are coupled to a bus 220. In one embodiment, the computing device 200 is a social network server 101. In another embodiment, the computing device 200 is a third-party server 107. In another embodiment, the computing device 200 is an application market server 150. In yet another embodiment, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, one or more processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. In one embodiment, the memory 204 includes the application broadcaster 103. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 240 receives notifications from the application broadcaster 103 via signal line 241 and transmits the notification to the social network server 101 for publication on the social network application 109 via the network 105. The communication unit 240 also receives information from the social network server 101 via the network 105, for example, information regarding the user's friends such as which applications they downloaded. The communication unit 230 is coupled to the bus 220. In one embodiment, the communication unit 240 includes a port for direct physical connection to the network or to another communication channel. For example, the communication unit 240 includes a USB, SD, CAT-5 or similar port for wired communication with the network 105. In another embodiment, the communication unit 240 includes a wireless transceiver for exchanging data with the network 105, or with another communication channel, using one or more wireless communication methods, such as IEEE 802.11, IEEE 802.16, BLUETOOTH® or another suitable wireless communication method.

In yet another embodiment, the communication unit 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 240 includes a wired port and a wireless transceiver. The communication unit 240 also provides other conventional connections to the network for distribution of files and/or media objects using standard network protocols such as TCP/IP, HTTP, HTTPS and SMTP as will be understood to those skilled in the art.

Example Application

Figure 2B:
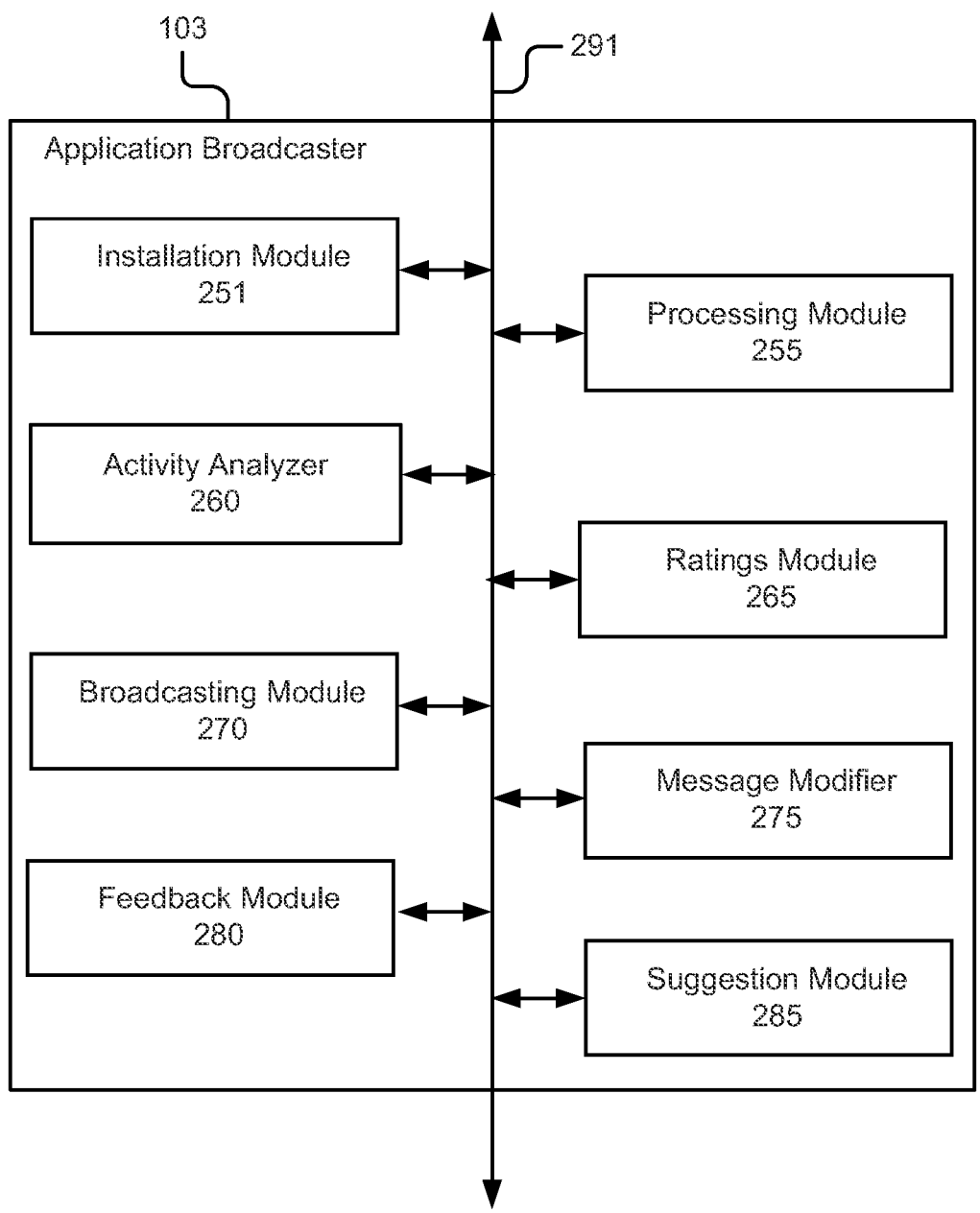
FIG. 2B is a block diagram illustrating an example of an application broadcaster.

Referring to FIG. 2B, the application broadcaster 103 is shown in more detail. In some embodiments, the application broadcaster 103 comprises an installation module 251, a processing module 255, an activity analyzer 260, a ratings module 265, a broadcasting module 270, a message modifier 275, a feedback module 280 and a suggestion module 285 that communicate over the software communication mechanism 291. Software communication mechanism 291 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 220, a combination thereof, etc.

The installation module 251 is software including routines for determining which applications are installed or uninstalled on a user device 115a. In one embodiment, the installation module 251 is a set of instructions executable by the processor 235 to provide the functionality described below for determining and transmitting a record of application installations or uninstallations. In another embodiment, the installation module 251 is stored in the memory 237 of the computing device 200 and is accessible and executable by the processor 235. In either embodiment, the installation module 251 is adapted for cooperation and communication with the processor 235, the processing module 255, the communication unit 240 and other components of the computing device 200.

In some embodiments the installation module 251 sends a notification to the processing module 255 indicating that an application has been installed or uninstalled on a user device 115a. In other embodiments where the application broadcaster 103d is stored on the application market server 150, the installation module 251 sends a notification to the processing module 255 indicating that the user downloaded an application from the application market 155. In some embodiments, the notification also includes any updates installed for the application. If the application broadcaster 103*c* is stored on the user device 115*a*, the installation module 251 detects the installation on user device 115*a*. If the application broadcaster 103 is stored on the social network server 101, a third-party server 107 or the application market server 150, the communication unit 240 receives a notification about installations from the user device 115*a* and transmits the notification to the installation module 251.

The processing module 255 is software including routines for processing information regarding an installed application and receiving information relating to user activity associated with the installed application. In one embodiment, the processing module 255 is a set of instructions executable by the processor 235 to provide the functionality described below for retrieving and processing information. In another embodiment, the processing module 255 is stored in the memory 237 of the computing device 200 and is accessible and executable by the processor 235. In either embodiment, the processing module 255 is adapted for cooperation and communication with the processor 235, the installation module 251, the activity analyzer 260, the broadcasting module 270, the communication unit 240 and other components of the computing device 200.

The processing module 255 receives and processes information about an installed/updated application in response to receiving a notification from the installation module 251. In some embodiments, the processing module 255 receives identifying information from the installation module 251, such as a unique identifier associated with the application. The processing module 255 retrieves information about the application from the memory 237 and transmits the information to the appropriate module. The phrase "information about the application" used herein encompasses its plain and ordinary meaning including, but not limited to a summary, a link to the application, a brief description of how to use the application, snap shots, videos, reviews and ratings from other users of the application, updates of the application, time of installation of the application, etc.

The processing module 255 also receives and processes user activity associated with the installed application if, for example, the application broadcaster 103*c* is stored on the user device 115*a* or the processing module 255 receives information directly from the user device 115. If the application broadcaster 103*a* is stored on the social network server 101, a third-party server 107 or the application market server 150, the communication unit 240 receives a notification about user activity from the user device 115*a* and transmits the notification to the processing module 255. The user activity includes the frequency of use of the application, the average time spent for each user session, or any other activity, for example a high score achieved by the user in a game. The processing module 255 stores the information in the memory 237.

In some embodiments, the processing module 255 processes data relating to the user's social networks, approved by the user for broadcasting messages regarding applications. In one embodiment, the processing module 255 also receives information regarding a status of a user that includes whether the user is currently logged-in to those social networks.

The ratings module 265 is software including routines for recording a user's rating and review of an installed application. In one embodiment, the ratings module 265 is a set of instructions executable by the processor 235 to provide the functionality described below for rating and reviewing the installed application. In another embodiment, the ratings module 265 is stored in the memory 237 of the computing device 200 and is accessible and executable by the processor 235. In either embodiment, the ratings module 265 is adapted for cooperation and communication with the processor 235, the activity analyzer 260, the broadcasting module 270, the communication unit 240 and other components of the computing device 200.

The ratings module 265 generates and sends a message requesting the user to rate and/or review the application after it has been installed. In some embodiments, the ratings module 265 waits a certain period of time before sending the message to ensure that the user has had enough time to test out the application to avoid receiving an uninformed rating. In some other embodiments, the ratings module 265 periodically sends a message to the user asking for updates to the rating. For example, the ratings module 265 sends the message a week after the user installs an update for the application. The ratings module 265 stores the ratings and the reviews given by the user for the installed application in the memory 237.

The activity analyzer 260 is software including routines for analyzing the user activity associated with the installed application. In one embodiment, the activity analyzer 260 is a set of instructions executable by the processor 235 to provide the functionality described below for analyzing user activity. In another embodiment, the activity analyzer 260 is stored in the memory 237 of the computing device 200 and is accessible and executable by the processor 235. In either embodiment, the activity analyzer 260 is adapted for cooperation and communication with the processor 235, the processing module 255, the broadcasting module 270, the ratings module 265 and other components of the computing device 200.

The activity analyzer 260 receives activity information from the user device 115*a* if the application broadcaster 103*c* is stored on the user device 115*a* or from the communication unit 240 if the application broadcaster 103 is stored on the social network server 101, a third-party server 107 or the application market server 150. The activity analyzer 260 also receives feedback information from the feedback module 280. The activity analyzer 260 analyzes the activity patterns of the user to determine whether a message regarding the installed application should be broadcasted to the user's social networks. The activity analyzer 260 analyzes the information stored by the processing module 255 in the memory 237 to determine whether user activity associated with an installed application meets a criterion for broadcast by inferring the importance of the installed application to the user. For example, if user 125*a* has five applications and user 125*b* has 100 applications, the activity analyzer 260 infers that a new application installed by user 125*a* is more important than a new application installed by user 125*b*. The activity analyzer 260 then sends a notification to the broadcasting module 270 to compose and broadcast a message about the new application installed by user 125*a*.

In some other embodiments, the activity analyzer 260 measures the user engagement with the application. In order to infer the importance of a new application installed by user 125*b*, the activity analyzer 260, for example, checks the user's rating for the application, ensures that the application has not been removed from user device 115*b* and processes data to determine the average time spent and the frequency at which user 125*b* uses the new application. For example, the activity analyzer 260 determines that a user is engaged when the user accesses the application extensively. If the above features indicate that the user activity associated with the installed application meets the criterion of being important to the user 125*b*, the activity analyzer 260 sends a notification to the broadcast module 270. In some embodiments, the activity analyzer 260 determines a threshold level of engagement before sending a notification to the broadcast module 270. For example, if the user's average rating of an application is a three out of five, the activity analyzer 260 transmits the notification if the rating exceeds the average rating. In one embodiment, the activity analyzer 260 ranks the installed applications based on the user's activity with an application and transmits the notification if the rank meets or exceeds the criterion.

The advantage in determining whether an installed application meets a criterion by inferring the importance of the installed application to the user is that the broadcasting module 270 does not publish notifications about every application that is installed, but only the applications that are important and liked by the user. This way the social network activity streams of people associated with the user are not cluttered with messages.

The broadcasting module 270 is software including routines for composing a message regarding an installed application and broadcasting it to the user's social networks via the communication unit 240. In one embodiment, the broadcasting module 270 is a set of instructions executable by the processor 235 to provide the functionality described below for composing and broadcasting messages. In another embodiment, the broadcasting module 270 is stored in the memory 237 of the computing device 200 and is accessible and executable by the processor 235. In either embodiment, the broadcasting module 270 is adapted for cooperation and communication with the processor 235, the processing module 255, the activity analyzer 260, the ratings module 265, the message modifier 275, the feedback module 280, the communication unit 240 and other components of the computing device 200.

In response to receiving a notification from the activity analyzer 260, the broadcasting module 270 composes a message regarding the installed application in order to publish it to external social platforms, e.g. the user's social networks. The message includes any information regarding the application and the user activity retrieved by the processing module 255. In one embodiment, the message includes an invitation requesting the user's friends to join the user in using the application by installing the application on their own user devices 125n. For example, the user can invite the user's friends to join a fantasy league created by the user with an application.

In some embodiments, the broadcasting module 270 broadcasts the message only upon receiving an approval for broadcasting the message from the user. In this example, the broadcasting module 270 generates a message that is transmitted to the user asking for permission to broadcast the message. In another embodiment, the broadcasting module 270 sends a message to the user allowing the user to manually choose the social networks to which the message should be broadcasted. In another embodiment, the user is also provided the option of controlling the visibility of the published message in the social networks. For example, the user might want people in a group of friends from school to know of an application installed by the user, but not a group of people from work. There are multiple ways to implement this option, for example, by manually selecting each person that will receive the message or by selecting particular groups of people that should receive the notification. In some embodiments, the broadcasting module 270 restricts the publication of certain applications according to keywords, categories or tags associated with the application. For example, the user indicates that gaming applications are not broadcast to a work group, violent games are not broadcast to a parenting group and educational games are broadcast to all groups. The broadcasting module 270 generates graphical data for displaying these options to the user. An example of one user interface that is provided to the user for configuring the broadcasting settings is described in detail below and illustrated in FIG. 5.

In some embodiments, the application broadcaster 103 includes a message modifier 275, which is software including routines for modifying a message that was generated by the broadcasting module 270. In one embodiment, the message modifier 275 is a set of instructions executable by the processor 235 to provide the functionality described below for modifying messages. In another embodiment, the message modifier 275 is stored in the memory 237 of the computing device 200 and is accessible and executable by the processor 235. In either embodiment, the message modifier 275 is adapted for cooperation and communication with the processor 235, the broadcasting module 270 and other components of the computing device 200.

Most of the current social networks have varying limitations on the content that is published on their activity streams. Thus the message modifier 275 modifies the message composed by the broadcasting module 270 based on the user's social networks. For example, the message modifier 275 would remove a summary of the installed application and provide a link to fit the message within a word limit imposed by a micro-blogging social network X. In another example, the message modifier 275 removes images associated with the application from a message posted to a text-only social network. Alternatively, the message modifier 275 uploads the image to a server and associates the image with a link for the text-only social network so that other users can select the link to view the image. In some other embodiments, certain commonly abbreviated words are shortened according to commonly accepted abbreviations. For example, the message modifier 275 shortens "because" to "bcs."

The feedback module 280 is software including routines for providing feedback regarding the published message. In one embodiment, the feedback module 280 is a set of instructions executable by the processor 235 to provide the functionality described below for providing feedback. In another embodiment, the feedback module 280 is stored in the memory 237 of the computing device 200 and is accessible and executable by the processor 235. In either embodiment, the feedback module 280 is adapted for cooperation and communication with the processor 235, activity analyzer 260, the communication unit 240 and other components of the computing device 200.

The feedback module 280 receives feedback via the communication unit 240 from the social network server 101 or the application market server 150 and provides feedback to the activity analyzer 260 on how the broadcasted message was received by people associated with the user. In some examples, the people associated with the user opt-in to having the feedback received by the feedback module 280. The feedback includes information such as whether the user's friends downloaded the application, liked/disliked the application, rated/reviewed the application, viewed the application, became a fan or put a page for the application in a group, etc. This method is advantageous as it allows the activity analyzer 260 to infer the type of applications the user's friends prefer so that it broadcasts messages regarding similar applications in future rather than spamming the activity streams.

In some embodiments, the collected information is anonymized before being provided as feedback to the activity analyzer 260. In this example, the information is displayed as general statistics about the application (e.g. 80% of users continue to frequently use this application after installation) instead of specifically mentioning people associated with the user.

The suggestion module 285 is software including routines for suggesting applications to the user. In one embodiment, the suggestion module 285 is a set of instructions executable by the processor 235 to provide the functionality described below for suggesting applications. In another embodiment, the suggestion module 285 is stored in the memory 237 of the computing device 200 and is accessible and executable by the processor 235. In either embodiment, the suggestion module 285 is adapted for cooperation and communication with the processor 235, the memory 237, the communication unit 240 and other components of the computing device 200.

Since friends share common interests, it is highly probable that applications installed by friends will interest the user as well. In embodiments where the user is associated with a large number of users, the suggestion module 285 can limit the suggestions based on activity from people that the user frequently interacts with or at least has a bi-directional relationship with (e.g. both user A and user B have the other user in a group). The suggestion module 285 receives information regarding applications via the communication unit 240 that are installed by people that the user has in groups or follows in social networks and suggests them to the user. For example, if 20 friends of the user installed an application, the suggestion module 285 will suggest that the user install that application as well. In one embodiment, the suggestion module 285 receives user profiles regarding user interests and identifies a correlation between the type of application and the user interests, such as a correlation that people the user is associated with that enjoy travelling are more likely to download an application about the weather. In some embodiments, the suggestion module 285 anonymizes the collected information before suggesting it to the user. In this example, the anonymized statistics are displayed as general statistics about users that share similar interests. For example, 90% of people that are interested in bikes enjoyed this biking application.

Example Methods

Figure 3:
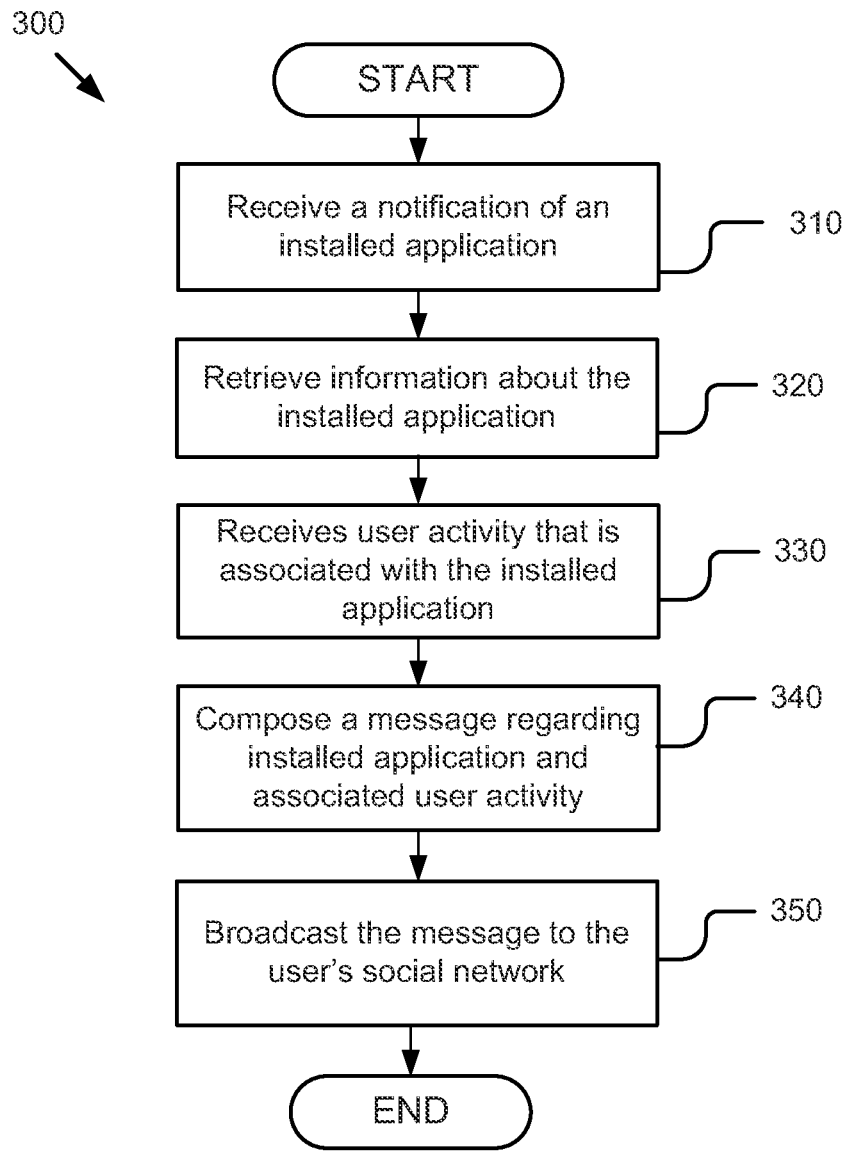
FIG. 3 is a flow diagram illustrating broadcasting a message to a user's social network regarding an installed application according to some embodiments.
Figure 4:
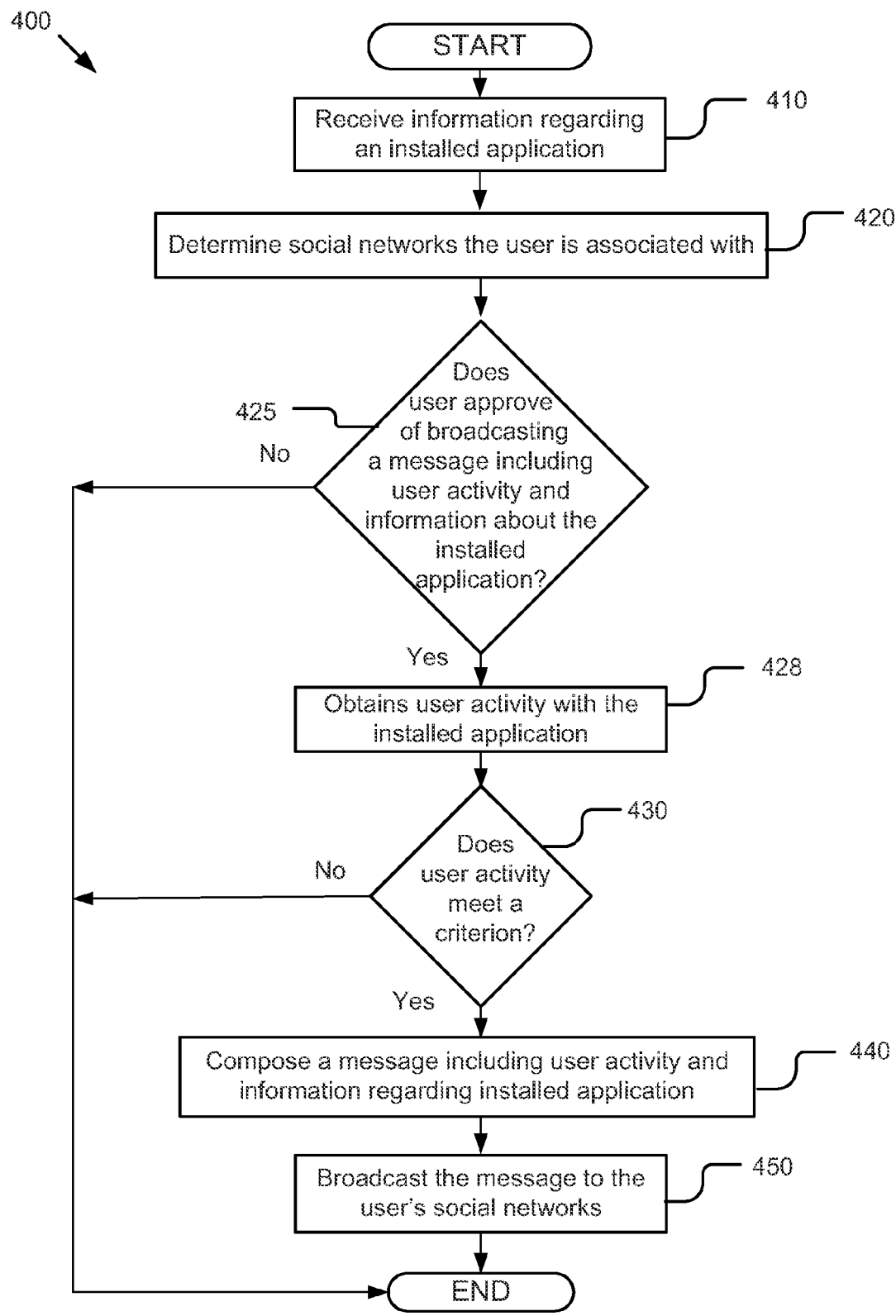
FIG. 4 is a flow diagram illustrating broadcasting a message to a user's social network regarding an installed application according to some embodiments.

Referring now to FIGS. 3-4, various embodiments will be described. FIG. 3 is a flow diagram 300 illustrating one embodiment for broadcasting a message to a user's social network regarding an installed application using an application broadcaster 103. In some embodiments the application broadcaster includes an installation module 251, a processing module 255 and a broadcast module 270. The processing module 255 receives 310 a notification from the installation module 251 indicating that a new application has been installed. The processing module 255 retrieves 320 information about the installed application. The retrieved information includes any of a summary, a link to the application, a brief description of how to use the application, images associated with the application, videos, reviews and ratings from other users of the application, updates of the application, time of installation of the application etc. The processing module 255 receives 330 user activity that is associated with the application. For example, the processing module 255 receives information about how the user is taking pictures of food for a restaurant application and the user rated the application five out of five stars. The broadcast module 270 composes 340 a message regarding the installed application and the user activity associated with the installed application and broadcasts 350 the message to the user's social network(s) via the communication unit 240. For example, the broadcast module 270 invites people in the user's group or friends of the user to download the food application so they can start sharing restaurant reviews and recipes. In some embodiments, the broadcast module 270 contacts the user directly, for example, through an email or a direct message for permission before broadcasting the notification.

FIG. 4 is a flow diagram 400 illustrating another embodiment for broadcasting a message to a user's social network regarding an installed application using an application broadcaster 103. In some embodiments, the application broadcaster 103 includes an installation module 251, a processing module 255, an activity analyzer 260, a broadcasting module 270 and a message modifier 275. As mentioned above, the processing module 255 receives 410 information regarding an installed application from the installation module 251. The processing module 255 also determines 420 the social networks the user is associated with. The broadcasting module 270 then determines 425 whether the user approves of broadcasting a message including information about the application and the user's activity with the application. If not, the process ends. In response to an approval from the user, the processing module 255 receives 428 user activity associated with the application. Based on the user's activity, the activity analyzer 260 determines 430 whether the user activity associated with the installed application meets a criterion. For example, the activity analyzer 260 applies a threshold level of usage to measure user engagement with the application including at least one a month, a week or a day. In another example, the activity analyzer 260 determines that the user activity associated with the installed application does not meet the criterion if the user submits a rating below a threshold level or the user gives the application a rating that is lower than the average rating that the user has given to the other downloaded applications. In some embodiments, the activity analyzer 260 also modifies the determination based on the number of applications that the user has already downloaded. For example, if the user has downloaded 1,000 applications and gives the application an average rating, the activity analyzer 260 determines that the user does not meet the criterion and people associated with the user do not want to see yet another broadcast message if the application is only considered average by the user. Conversely, if the user only downloads a few applications, people in the user's groups might be interested in seeing a broadcast message each time the user downloads the application or positively engages with the application.

If the user activity associated with the installed application does not meet the criterion, the process ends. If the user activity associated with the installed application meets the criterion, the broadcasting module 270 composes 440 a message including the user's activity and information regarding the application and broadcasts 450 it to the user's social networks via the communication unit 240. In some embodiments the message modifier 275 modifies the message according to the limitations of each social network before the broadcasting module 270 broadcasts the message.

Example User Interfaces

Figure 5:
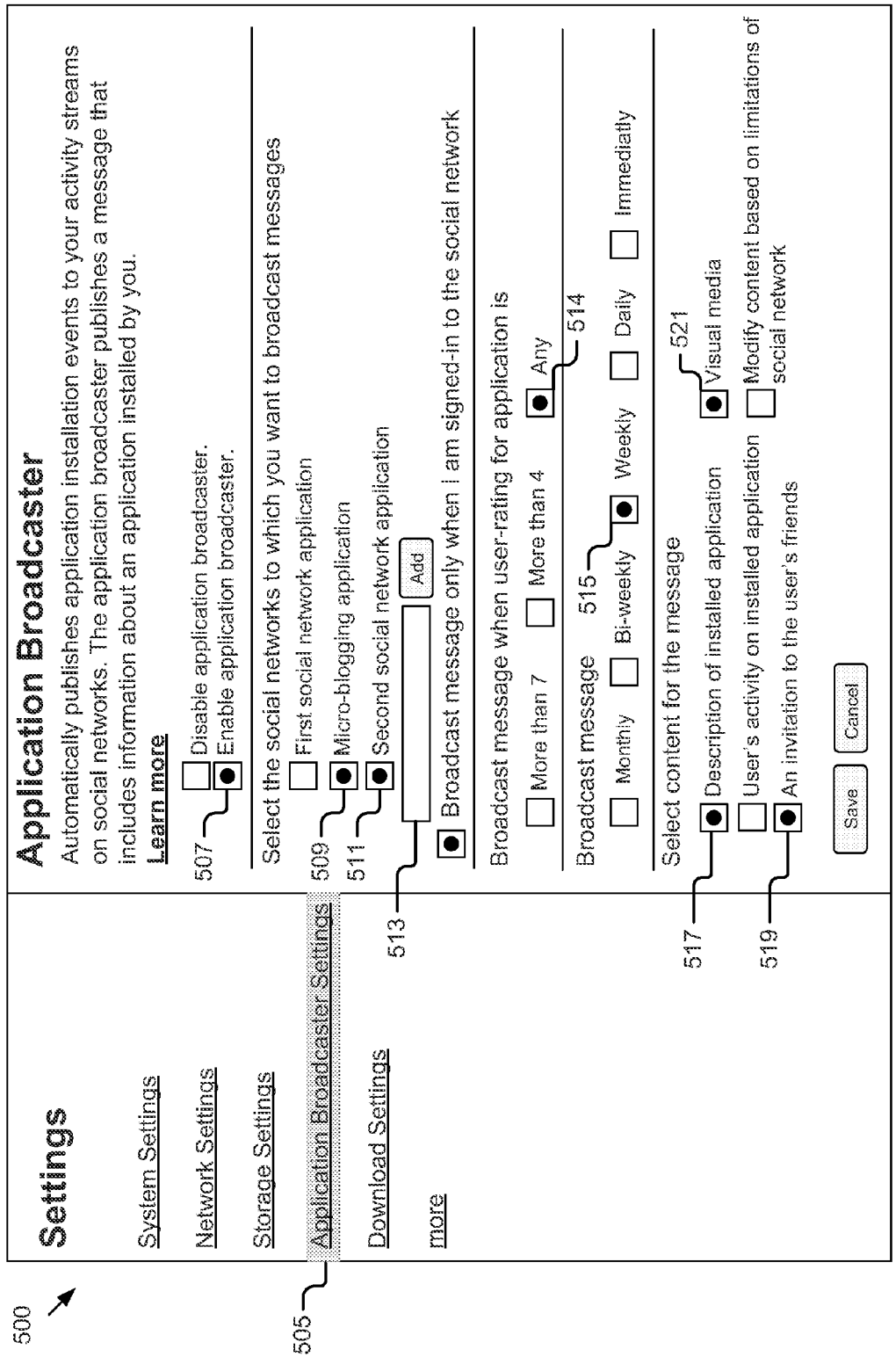
FIG. 5 is a graphical illustration of application broadcasting settings according to some embodiments.

Turning now to FIG. 5, an example graphical illustration 500 of settings for configuring the broadcasting module 270 is illustrated. In some embodiments, the broadcasting module 270 generates graphical data for displaying the broadcast settings to a user. In the left-hand column, various settings associated with the website are included. In this example the application broadcast settings 505 are highlighted. On the right-hand side, the various broadcast settings are displayed. The first box includes settings for enabling or disabling the broadcast features. The radio button 507 for enabling the application broadcaster is checked.

The second box includes a list of all social networks that are associated with the application broadcaster. In some embodiments a pre-populated list of social networks is provided to the user and the user enters credentials for the social network, for example, a username, password and a security challenge. Once the user has provided credentials, the user can select which social networks receive broadcast messages from the broadcast application 103. In this example, the user selected buttons 509, 511 for a micro-blogging application and a second social network. Below the buttons is a text box 513 for inputting the uniform resource locator (URL) of a social network that is not included in the list of pre-populated applications.

The third box includes options for when to send a broadcast message for particular applications. In this example the user chooses between sending a broadcast message for applications that received a user rating of more than seven out of a 10 point scale, more than five out of a ten point scale or any user rating. In this case the user selected the radio button 514 for the "any" option. Although the user ratings are represented on a 10-point scale, the scale can be adjusted for other numbers of points.

The fourth box is an example of an option for modifying how often the broadcast module 270 transmits messages. In some embodiments, the broadcast module 270 stores messages for a periodic transmission at one time. In this example, the radio buttons are for monthly, bi-weekly, weekly, daily and immediately. The user selected the radio button 515 for "weekly."

The fifth box includes an example of the content of the broadcast message. The user can select multiple numbers of options including a description of the installed application, the user's activity on the installed application, an invitation to the user's friends and visual media (e.g. images, videos, etc.). The fifth box also includes an option where responsive to selection, the message modifier 275 modifies content based on the limitations of the social network. In this example, the user selected buttons 517, 519, 521 for the description of the installed application, an invitation to the user's friends and visual media, respectively. Although this example sends invitations to the user's friends, the option can be modified for other types of social networks, for example, by sending invitations to people in the user's groups or people that the user follows.

FIG. 6A is an example 600 illustrating the broadcast message for a social network. In this example, the broadcasting module 270 transmits the broadcast message 605 from user 2 to user 1's stream of content. The broadcast message 605 includes an advertisement for the application along with a direct link to the application, for example, a direct link to the application market 155 where the application can be purchased. The broadcast message 605 also includes an image of the application, the score from another person associated with user 1: user 4 and a link to a webpage for registering for the game.

Figure 6B:
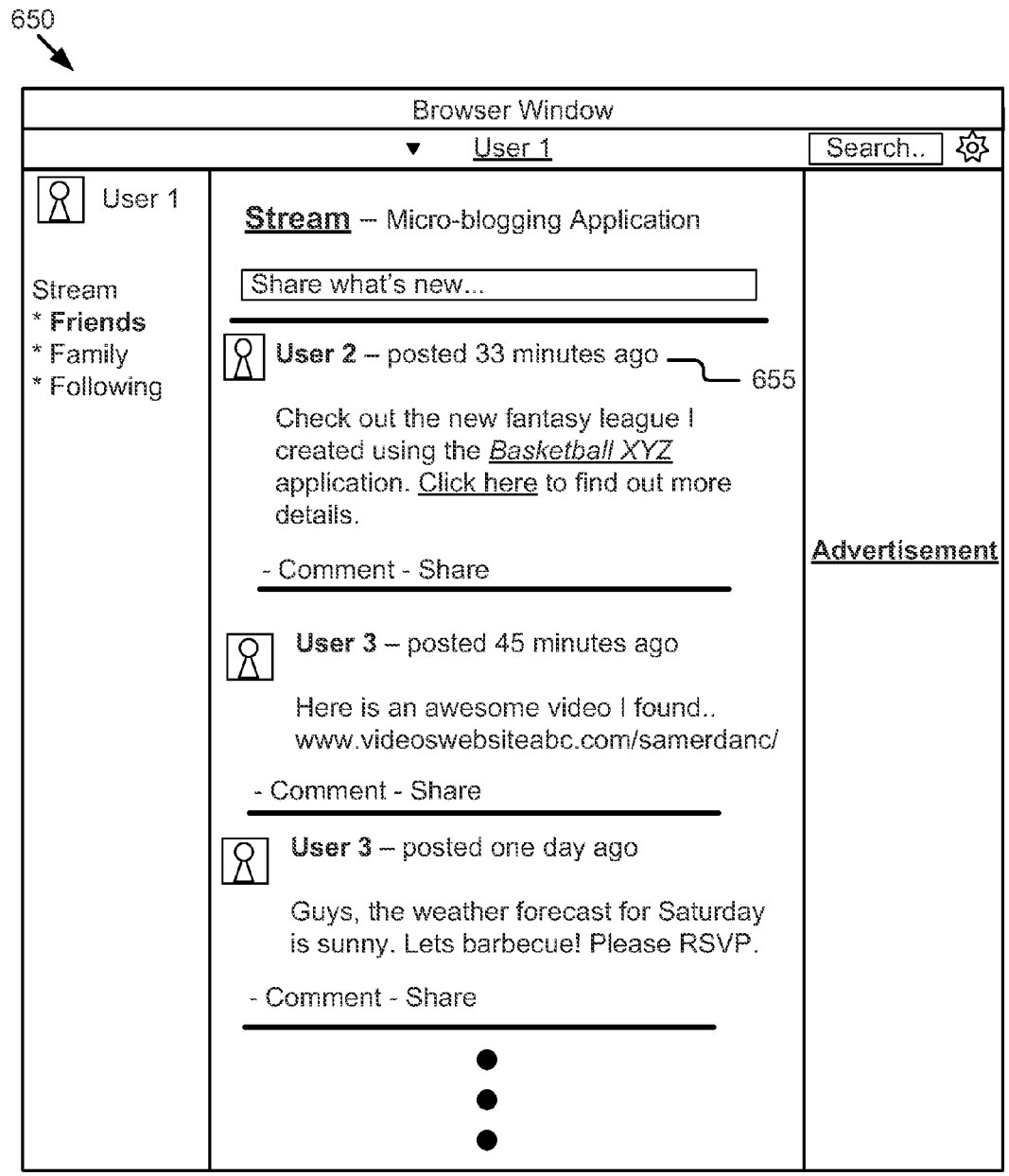
FIG. 6B is a graphical illustration of a stream of content on a micro-blogging website according to some embodiments.

FIG. 6B is an example 650 illustrating the broadcast message for a micro-blogging application for the same application illustrated in FIG. 6A. In this example, the broadcast message 655 from user 2 is limited to 114 characters because the micro-blogging application won't accept more than 140 characters. In addition, the micro-blogging application also does not accept images so the message modifier 275 removed the image and portions of the text from the broadcast message so that the full meaning of the message is understandable.

In the following description, for purposes of explanation, numerous specific details are set forth in order to provide a thorough understanding of the specification. It will be apparent, however, to one skilled in the art that the embodiments can be practiced without these specific details. In other embodiments, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification.

What is claimed is:

1. A computer-implemented method for using social networks for spreading an application, executing on one or more computing devices, the method comprising:
    receiving, with the one or more computing devices, a notification indicating that a user has installed the application on a user device;
    receiving user activity associated with the installed application, the user activity including at least one of a frequency of usage of the installed application and a time spent by the user with the installed application;
    determining, with the one or more computing devices, an importance of the installed application based on the user activity;
    determining, with the one or more computing devices, whether the importance of the installed application meets a criterion for broadcasting information about the installed application by determining at least one of the user's interaction with the installed application, the user's rating for the installed application, and a number of applications installed by the user; and by determining that the installed application has not been removed from the user device;
    composing, with the one or more computing devices, a message including the user activity and information regarding the installed application responsive to determining that the user activity meets the criterion;
    determining, with the one or more computing devices, one or more social networks to which to broadcast the message regarding the installed application, the one or more social networks determined at least in part based on information related to the user; and
    broadcasting, with the one or more computing devices, the message to the one or more social networks associated with the user.

2. The method of claim 1, further comprising:
    transmitting the message to the user; and
    receiving an approval from the user for broadcasting the message to the one or more social networks associated with the user.

3. The method of claim 1, further comprising modifying the message based on a setting associated with each of the one or more social networks associated with the user.

4. The method of claim 1, further comprising receiving feedback from the one or more social networks, the feedback including an interaction of a friend of the user with the message.

5. The method of claim 4, further comprising analyzing reviewing the feedback to determine an interest of the friend of the user.

6. The method of claim 1, wherein the information about the installed application includes at least one of a summary of the installed application, a reference to the installed application, a photo, a video, a review and a rating.

7. The method of claim 1, wherein the notification further indicates an installation of an update to the installed application.

8. The method of claim 1, further comprises:
    receiving, from the one or more social networks, information about applications installed by a friend of the user; and
    suggesting the applications installed by the friend of the user to the user.

9. A system for using social networks for spreading an application, the system comprising:

one or more processors; and a memory storing instructions that, when executed, cause the system to:

receive a notification indicating that a user has installed the application on a user device;

receive user activity associated with the installed application, the user activity including at least one of a frequency of usage of the installed application and a time spent by the user with the installed application;

determine an importance of the installed application based on the user activity;

determine whether the importance of the installed application meets a criterion for broadcasting information about the installed application by determining at least one of the user's interaction with the installed application, the user's rating for the installed application, and a number of applications installed by the user; and by determining that the installed application has not been removed from the user device;

compose a message including the user activity and information regarding the installed application responsive to determining that the user activity meets the criterion;

determine one or more social networks to which to broadcast the message regarding the installed application, the one or more social networks determined at least in part based on information related to the user; and broadcast the message to the one or more social networks associated with the user.

10. The system of claim 9, wherein the one or more processors further transmits the message to the user and receives an approval from the user for broadcasting the message to the one or more social networks associated with the user.

11. The system of claim 9, wherein the one or more processors receive feedback from the one or more social networks, the feedback including an interaction of a friend of the user with the message.

12. The system of claim 11, wherein the one or more processors review the feedback to determine an interest of the friend of the user.

13. The system of claim 9, wherein the one or more processors request the user to perform at least one of rating and reviewing the installed application.

14. The system of claim 9, wherein the one or more processors transmit the notification that indicates at least one of the installation of the application and an installation of an update to the installed application.

15. A computer program product comprising a non-transitory computer useable medium including a computer readable program, wherein the computer readable program when executed on a computer causes the computer to perform steps comprising:

receiving a notification indicating that a user has installed the application on a user device;

receiving user activity associated with the installed application, the user activity including at least one of a frequency of usage of the installed application and a time spent by the user with the installed application;

determining an importance of the installed application based on the user activity;

determining whether the importance of the installed application meets a criterion for broadcasting information about the installed application by determining at least one of the user's interaction with the installed application, the user's rating for the installed application, and a number of applications installed by the user; and by determining that the installed application has not been removed from the user device;

composing a message including the user activity and information regarding the installed application responsive to determining that the user activity meets the criterion;

determining one or more social networks to which to broadcast the message regarding the installed application, the one or more social networks determined at least in part based on information related to the user; and broadcasting the message to the one or more social networks associated with the user.

16. The computer program product of claim 15, further causes the computer to modify the message based on a setting associated with each of the one or more social networks associated with the user.

17. The computer program product of claim 15, further causes the computer to receive, from the one or more social networks, information about applications installed by a friend of the user and suggesting the applications installed by the friend of the user to the user.

\* \* \* \* \*